Patented Aug. 22, 1950

2,519,408

UNITED STATES PATENT OFFICE 2,519,408

ANTISPASMODICS

Nathan Sperber, New York, and Domenick Papa, Brooklyn, N. Y., and Erwin Schwenk, Montclair, N. J., assignors to Schering Corporation, Bloomfield, N. J., a corporation of New Jersey No Drawing. Application October 9, 1946, Serial No. 702,086

9 Claims. (Cl. 260—295.5)

This invention relates to a new group of compounds having useful antispasmodic properties. The new compositions of matter of the invention are amides of pyridine and piperidine carboxylic acids, substituted at the amido nitrogen by a group including a quaternary carbon atom substituted by alkyl or alkyl and aryl groups.

The compounds of the invention may be represented by the general formula:

A.CONH.(CH$_2$)$_{n-1}$.C(R)$_3$ wherein A represents a heterocyclic ring selected from the group consisting of pyridine, piperidine and N-alkylated piperidine, at least two of the R's are lower alkyl groups containing not more than five carbon atoms, the third R being selected from the group consisting of lower alkyl groups containing not more than five carbon atoms, phenyl and cyclohexyl, and $n$ is an integer not greater than 2. The total number of carbon atoms in the R groups is preferably from 10 to 15.

These compounds have been found to have very useful antispasmodic activity. They are equally effective against spasms of either nervous or muscular origin and are characterized by their extremely low oral toxicity. Several different types of synthetic antispasmodic agents have previously been described, but, in general, they have either strong neurotropic or strong musculotropic activity together with a rather high oral toxicity.

The compounds of the present invention may conveniently be prepared by the condensation of a pyridine or piperidine carboxylic acid chloride or ester with an appropriately trisubstituted carbinamine or ethylamine. In general, the pyridine carboxylic acid is converted into the acid chloride by any of the conventional methods, suspended in pyridine, and the substituted amine added dropwise with stirring. After heating the reaction mixture for some time, the reaction product is poured into ice and water, and the crystalline precipitate is isolated and recrystallized by conventional methods. The substances so obtained are stable and well defined solids which may be converted into crystalline salts, such as the hydrochloride and hydrobromide. We have found that trialkyl carbinamines, trialkyl ethylamines, aryl dialkyl carbinamines and aryl dialkyl ethylamines are representative types of amines suitable for the synthesis of the amides of the invention.

When the piperidine carboxylic acids are used in the synthesis described above, the secondary amino nitrogen is preferably blocked by acylation, for example, with a benzoyl or acetyl group before the condensation reaction. The piperidine derivatives may also be obtained by direct reduction of the corresponding pyridine compound. The reduction of the pyridine compounds may be effected with Raney nickel catalyst in ether, methanol or dioxane as solvents. The reduction in methanol yields compounds in which the cyclic nitrogen is methylated; the reduction in dioxane yields the unalkylated derivative which may then be alkylated by any of the conventional methods, for example with a methyl or ethyl group.

The following examples are illustrative of the principles of the invention:

Ex. 1.—β,β,β-tributylethyl nicotinamide

To 0.1 m. of nicotinic acid there is added 50 cc. of thionyl chloride. The mixture is refluxed for 30-45 minutes and the thionyl chloride is removed under vacuum on the steam bath. Fifty cc. of dry benzene are added and the solvent removed under vacuum. The nicotinoyl chloride hydrochloride is then suspended in 50-75 cc. of anhydrous pyridine and 0.1 m. β,β,β-tributylethylamine in 25 cc. of dry pyridine is added dropwise with stirring. The flask is heated on the steam bath for a few hours with stirring and the dark solution poured on ice and water. The crystalline precipitate is filtered, washed with water and recrystallized from ethanol-water. M. P. 105.5-106° C. The hydrochloride melts at 155.7-156.2° C. The picrate melts at 141.7-142.7° C.

Ex. 2.—β,β,β-Tributylethyl isonicotinamide

This amide is prepared in exactly the same way as in Example 1 using isonicotinic acid. The recrystallized amide melts at 91.5-92° C.

Ex. 3.—β,β,β-Tributylethyl picolinamide 0.1 m. of ethyl picolinate and 0.1 m. of β,β,β-tributylethylamine in 50 cc. of xylene are refluxed for 48 hours. The solvent is distilled off under vacuum. The residue is a viscous, colorless oil which crystallizes upon cooling to a low melting solid. The latter distills at 184-185° C./0.5 mm.

Ex. 4.—Tributylmethyl nicotinamide

Tributylmethylamine and nicotinoyl chloride hydrochloride are reacted as described in Example 1 to yield the methyl amide which melts at 103-103.5° C. after recrystallization from aqueous alcohol.

Ex. 5.—β,β,β(Dibutyl,phenyl) ethyl nicotinamide

This amide is prepared from β,β,β(dibutyl, phenyl)ethylamine and nicotinoyl chloride hydrochloride in accordance with the method of Example 1. The amide is obtained as a white, crystalline solid melting at 132.5–133° C.

*Ex. 6.—(Dibutyl,phenyl) methyl nicotinamide*

This amide is prepared from nicotinoyl chloride hydrochloride and α,α-dibutylbenzylamine as described in Example 1.

*Ex. 7.—β,β,β-Tributylethyl-N-methyl-nipecotamide*

0.1 mol of the tributylethyl nicotinamide of Example 1 is dissolved in 100 cc. of methanol and reduced in a bomb with hydrogen and Raney nickel. Upon removal of the solvent, an oil remains which soon crystallizes. M. P. 68–69° C. The hydrochloride melts at 167.7–168.7° C.

An alternate method for securing this amide is to react the nipecotic acid with the appropriate amine by any of the several known methods. The resulting β,β,β-tributyl ethyl nipecotamide is a viscous oil distilling at approximately 212–214° C./3–5 mm. Methylation with formic acid and formalin yields the N-methyl derivative melting at 66–68° C. Its methiodide obtained in the customary manner melts at 224–227° C.

*Ex. 8.—Preparation of β,β,β-Tributylethyl nipecotamide*

The amide of Example 1 is reduced with Raney nickel catalyst in dioxane at a pressure of approximately 1,000 lbs. and a temperature of 150–175° C. After filtering off the catalyst, the solution is treated with charcoal, vacuum concentrated and the residue distilled over at 210–215° C./3–5 mm.

An alternate method of securing this compound is described in Example 7.

*Ex. 9.—β,β,β(Dipropyl,ethyl)ethyl nicotinamide*

By condensing β,β - dipropyl-β-ethyl-ethylamine with nicotinoyl chloride as described in Example 1, the amide is obtained as a yellow viscous oil which slowly solidifies. The oil distills at a temperature of approximately 200–202° C./3 mm.

*Ex. 10.—β,β,β(Diamyl,butyl) ethyl nicotinamide*

This amide is prepared from β,β-diamyl-β-butyl-ethylamine and nicotinoyl chloride as described for the tributyl compound of Example 1.

We claim:
1. An antispasmodic composition comprising a compound of the general formula

$$Py \cdot CO \cdot NH \cdot CH_2 \cdot C(R)_3$$

wherein Py represents a pyridine ring and at least two of the R's are alkyl groups containing from three to five carbon atoms, and the third R is selected from the group consisting of alkyl groups containing from three to five carbon atoms, and phenyl, the total number of carbon atoms in the R groups being at least 10 and not more than 15.

2. Beta-trialkyl ethylamides of pyridine carboxylic acids wherein the alkyl groups contain from three to five carbon atoms and the total number of carbon atoms in the three alkyl groups is at least 10 and does not exceed 15.

3. Beta,beta,beta(dialkyl,phenyl) ethylamides of pyridine carboxylic acids wherein each of the two alkyl groups contains from three to five carbon atoms and the total number of carbon atoms in the alkyl groups does not exceed 9.

4. β,β,β-Trialkylethyl nicotinamides wherein each of the alkyl groups contains from three to five carbon atoms and the total number of carbon atoms in the three alkyl groups is at least 10 and does not exceed 15.

5. β,β,β-Tributylethyl nicotinamide.
6. β,β,β-Tributylethyl isonicotinamide.
7. β,β,β-Tributylethyl picolinamide.
8. β,β,β(Dibutyl,phenyl) ethyl nicotinamide.
9. β,β,β(Diamyl,butyl) ethyl nicotinamide.

NATHAN SPERBER.
DOMENICK PAPA.
ERWIN SCHWENK.

REFERENCES CITED

The following references are of record in the file of this patent:

FOREIGN PATENTS

| Number | Country | Date |
|--------|---------|------|
| 824,042 | France | Jan. 31, 1938 |

OTHER REFERENCES

Billman, Journal American Chem. Soc., April 1944, pp. 540 and 541.

Heibron, vol. III, Dictionary of Organic Compounds, page 426.